United States Patent
Jones et al.

[11] Patent Number: 5,991,271
[45] Date of Patent: Nov. 23, 1999

[54] SIGNAL-TO-CHANNEL MAPPING FOR MULTI-CHANNEL, MULTI-SIGNAL TRANSMISSION SYSTEMS

[75] Inventors: David C. Jones, Louisville; Youngho Lee, Boulder; Bruce A. Phillips, Highlands Ranch, all of Colo.

[73] Assignee: US West, Inc., Englewood, Colo.

[21] Appl. No.: 08/575,402

[22] Filed: Dec. 20, 1995

[51] Int. Cl.[6] ...................................................... H04J 1/00
[52] U.S. Cl. .......................... 370/252; 370/437; 370/487
[58] Field of Search ................................... 370/252, 430, 370/437, 464, 465, 480, 486, 490, 496, 333, 466, 467; 348/14, 15, 16; 379/414, 416, 417

[56] References Cited

U.S. PATENT DOCUMENTS

| | | | |
|---|---|---|---|
| 4,930,120 | 5/1990 | Baxter et al. | 370/487 |
| 4,947,459 | 8/1990 | Nelson et al. | 359/110 |
| 4,999,833 | 3/1991 | Lee | 370/390 |
| 5,375,123 | 12/1994 | Andersson et al. | 370/333 |
| 5,404,574 | 4/1995 | Benveniste | 455/33.1 |
| 5,512,937 | 4/1996 | Beierle | 348/14 |
| 5,534,914 | 7/1996 | Flohr et al. | 348/15 |
| 5,610,916 | 3/1997 | Kostreski et al. | 370/487 |

*Primary Examiner*—Alpus H. Hsu
*Assistant Examiner*—Kwang B. Yao
*Attorney, Agent, or Firm*—Brooks & Kushman P.C.

[57] ABSTRACT

A system and method for allocating signal types to transmission channels in a multi-channel, multi-signal transmission system uses one or more decision rules to determine a signal-to-channel mapping based on a predetermined performance criterion, such as signal-to-noise ratio (SNR), SNR margin, or target transport margin at a particular bit error rate (BER), rather than random assignment. The system and method improve overall performance of a transmission system carrying multiple signal types, such as telephony, compressed digital video, broadcast video, and low and high speed data. The decision rules are implemented over the entire transmission system to simplify recordkeeping and associated aspects of network operations.

19 Claims, 6 Drawing Sheets

SIGNAL-TO-CHANNEL MAPPING FOR MULTI-CHANNEL, MULTI-SIGNAL TRANSMISSION SYSTEMS

TECHNICAL FIELD

The present invention relates to a system and method for allocating signal types to transmission channels in a multi-channel, multi-signal transmission system to improve overall system performance.

BACKGROUND ART

Current multi-signal transmission systems deliver multiple types of signals such as telephony, digitized video, and digital data signals over an infrastructure which utilizes various types of physical transmission media. Audio and video information originating at a service provider may be delivered to an end user via a complex switching network employing Radio Frequency (RF), fiber optic, coaxial cable (Coax), and twisted pair copper cabling which may be shielded (STP) or unshielded (UTP). As is known, each type of cabling includes trade-offs between performance characteristics and cost which must be considered in designing and implementing such a transmission system.

As consumers migrate toward information intensive services such as digital television, interactive television, and computer-related on-line services, the demand on the installed infrastructure continues to increase. To meet this increased demand, the physical transmission media forming the delivery infrastructure must eventually be replaced. However, this is an arduous task which requires significant time and expense. Thus, regardless of the particular physical media utilized in any portion of the transmission system, it is desirable to improve the overall system operating performance to maximize or optimize the use of currently installed transmission media.

In a traditional distribution system, a signal which originates at the information service provider may travel through multiple segments of physical transmission media connected by electrical, electronic, or optoelectronic switches before arriving at its destination. The various switches are used to route the signal from a source to a destination where the signals are typically randomly assigned to a particular channel within a multi-channel distribution cable.

SUMMARY OF THE INVENTION

It is thus an object of the present invention to provide a system and method for improving overall system performance in a multi-channel, multi-signal transmission system.

A further object of the present invention is to maximize system performance by selectively assigning particular signal types to particular channels based on a uniform decision rule.

Another object of the present invention is to provide a system and method for optimizing overall system performance by identifying a particular signal-to-channel mapping within a given type of distribution cable which maximizes the minimum margin across all digital links transported by the cable.

A still further object of the present invention is to provide a system and method for communication channel management which utilizes signal-to-noise ratio (SNR) to selectively assign a particular signal to a particular channel based on maximizing the minimum SNR margin across all digital links transported by a particular distribution cable.

Yet another object of the present invention is to provide a system and method for simplifying cable plant recordkeeping by utilizing a consistent decision rule across an entire cable plant region.

In carrying out the above objects and other objects and features of the present invention, a method for allocating a signal to a channel in a multi-channel, multi-signal transmission system is provided. The method includes selecting a channel performance criterion, selecting one of the plurality of channels for evaluation, evaluating the performance criterion for the selected channel for each of the signal types, and allocating a signal type to the selected channel based on the evaluation. A system is also provided for implementing the method of the present invention.

The advantages accruing to the present invention are numerous. For example, the present invention increases system performance for a particular installed transmission system with little or no added cost because the physical transmission media need not be replaced. In addition, the present invention may be quickly implemented since it utilizes the currently installed cable plant. If, on the other hand, new cable plant is to be deployed, application of the present invention maximizes the capabilities of that new cable plant.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
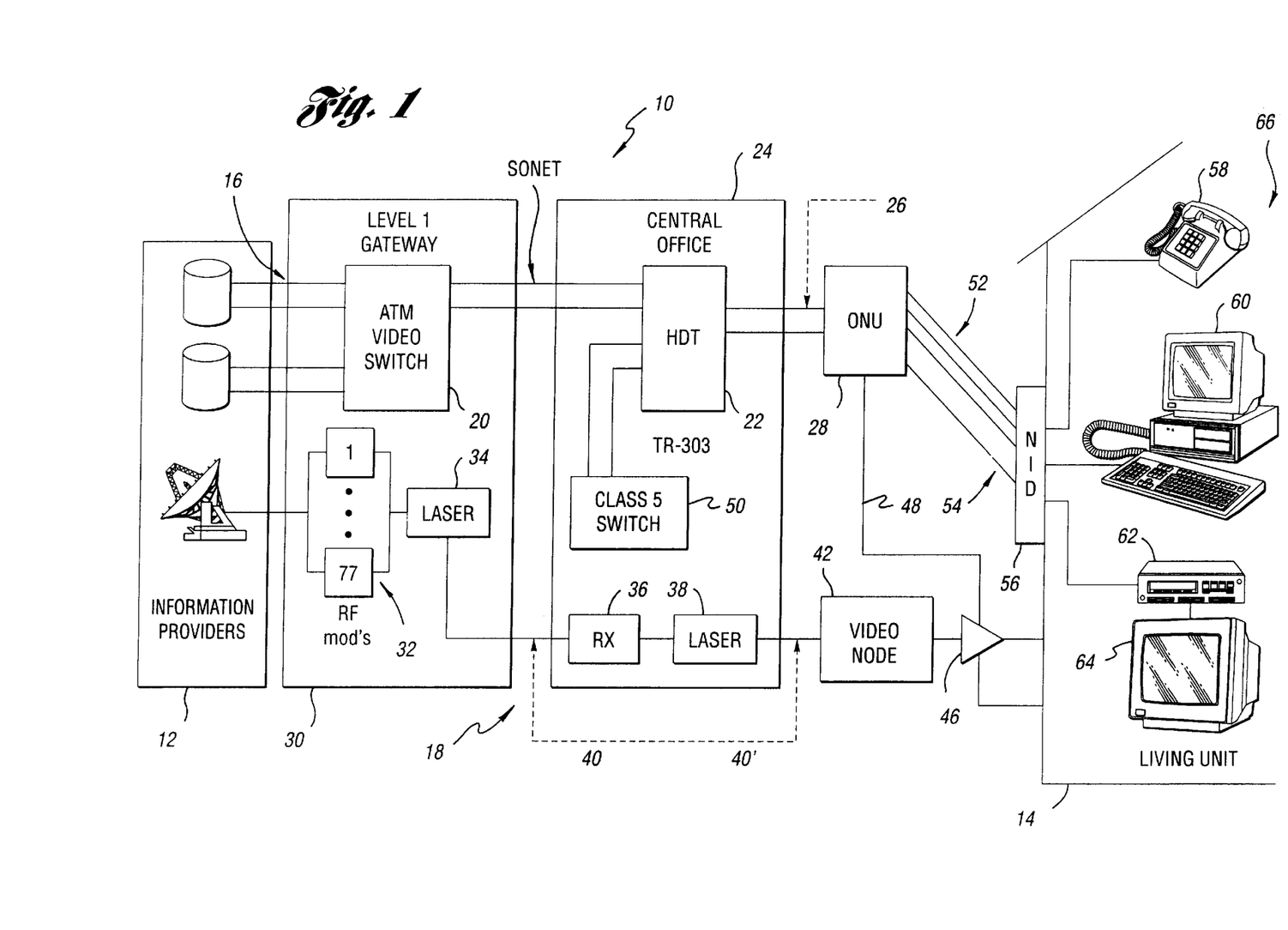
FIG. 1 is a block diagram of a broadband transmission architecture from an information service provider to a customer utilizing curbside optical network units (ONUs)

Referring now to FIG. 1, a block diagram of a multi-channel, multi-signal transmission system architecture is shown. The system, indicated generally by reference numeral 10, delivers various types of signals, such as telephony, compressed digital video, data, and broadcast video, from an information provider 12 to one or more living units 14. System 10 is divided into a digital transport network, indicated generally by reference numeral 16, in parallel with an analog NTSC broadcast video overlay, indicated generally by reference numeral 18. The digital portion of the network carries both Asymmetric Asynchronous Transfer Mode (A-ATM) and Synchronous Transfer Mode (STM) traffic over separate Interoffice Facilities and integrated access networks. STM traffic consists of telephony and packet data while A-ATM traffic carries compressed digital video, control channels, and other forms of data. As these types of systems evolve, the transport of broadcast video channels will likely migrate from analog portion 18 to digital portion 16.

With continuing reference to FIG. 1, a digital signal originating at information providers 12 may pass through a number of narrowband STM and broadband ATM switches, such as ATM Video Switch 20, which route the digital traffic to Host Digital Terminals (HDTs) 22 within each serving Central Office 24. A fiber optic system 26 delivers A-ATM and STM traffic to a set of remote Optical Network Units (ONUs) 28, each of which routes the correct signals to a set of 16–32 subtending Living Units (LUs) 14.

Analog signals may be captured by RF receivers at information providers 12 and transmitted to RF modulators 32 within Level 1 gateways 30 where they are converted to optical signals via laser 34. The optical signals are transmitted via optical fiber 40 to appropriate receivers 36 within each serving Central Office 24. The signals may be processed and retransmitted by laser 38 over optical fiber 40' to video nodes 42 where they are converted to electrical signals which are transmitted to splitter amplifiers 46 which distribute the signal via coax 48. These signals may be delivered directly to a living unit 14 or combined in an ONU 28 as explained in greater detail with reference to FIG. 2.

Each ONU is capable of providing copper UTP 52 and coax drop lines 54 to a Network Interface Device (NID) 56 of an associated LU 14. A number of devices may be connected to NID 56, such as telephones 58, computers 60, set-top terminals, i.e. "decoder boxes" 62, televisions 64, and the like. Such devices may be generally referred to as Customer Premise Equipment (CPE) 66.

Figure 2:
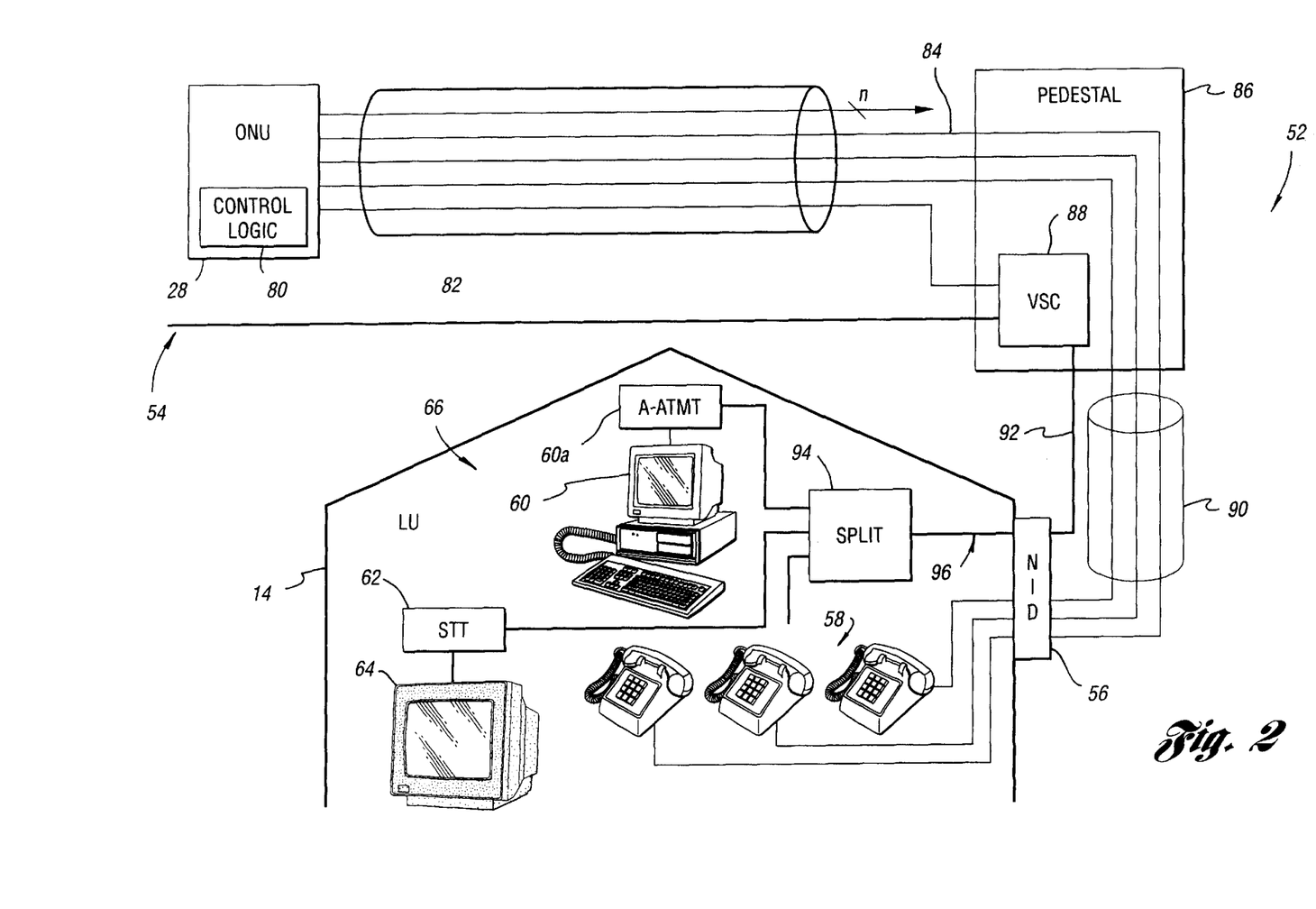
FIG. 2 is a more detailed block diagram of a broadband distribution architecture from a curbside ONU to a particular associated living unit (LU)

FIG. 2 illustrates one possible transmission system architecture for distributing signals from a particular ONU 28 to its associated LUs 14 (only one of which is specifically illustrated). As shown, the links between an LU 14 and its associated ONU 28 include a combination of copper twisted pairs 84 and coaxial cabling 92. Twisted pair distribution cable 82 carries signals between ONU 28 and its subtending downstream pedestals 86 via associated twisted pairs 84. Allocation of particular signal types to a particular twisted pair within distributing cable 82 according to the present invention may be performed by control logic 80. Alternatively, channel management according to the present invention may be performed by a programmed microprocessor prior to a hardwired implementation which assigns particular signal types to particular channels across the entire cable plant based on the results generated by the microprocessor.

With continuing reference to FIG. 2, distribution cable 82 may be an air-core (aerial) or filled (buried) cable having 28, 50, or 84 twisted pairs. Preferably, the length of distribution cable 82 is less than or equal to 600 feet. Twisted pairs 84 within each distribution cable 82 are divided into sets of four, with each set dedicated to a specific LU. Although not specifically illustrated, some installations allow LUs 14 which are in close proximity to an ONU 28 to be served directly by twisted pair and coaxial drop cables without the use of an intervening distribution cable 82.

The concept of allocating a set of twisted pairs 84 for each LU 14, with each set to be used only for connecting to its intended LU and never any of the other LUs, is referred to as a dedicated plant. Use of dedicated cable plant according to the present invention simplifies the recordkeeping for channel management as described in greater detail below.

In one embodiment, three of the twisted pairs 84 within distribution cable 82, referred to as the narrowband pairs, are utilized for delivery of narrowband telephony services such as POTS (Plain Old Telephone Service), ISDN (Integrated Services Digital Network) basic rate, or low speed data services. By utilizing the system and method of the present invention, these narrowband pairs may be utilized more efficiently. A fourth twisted pair 84 within each set, referred to as the A-ATM pair, carries A-ATM digital video and/or data in the downstream direction (from the service provider toward the customer), and signalling, control, and digital data in the upstream direction (from the customer toward the service provider).

The downstream signal within each A-ATM pair carries ATM cells embedded in the payload of a SONET STS-1 (51.84 Mb/s) physical frame, using a 16-point Carrierless Amplitude/Phase (CAP-16) line code, well known in the art. The upstream signal in an A-ATM pair also carries ATM cells, but at a reduced line rate of 1.62 Mb/s using a CAP-4 line code. Simultaneous upstream and downstream transport over each A-ATM pair is provided through frequency division multiplexing of the two signals.

As illustrated in FIG. 2, the STM signals are transmitted from pedestal 86 to an NID 56 using a UTP drop cable 90. From NID 56, existing in-home wiring carries these signals to various CPE devices 66. The A-ATM pair terminates at the pedestal 86 on a Video Signal Combiner (VSC) 88 within pedestal 86. The VSC combines the video signal from the A-ATM pair with the analog video signal coming in from the distribution coax cable 54. Because the A-ATM and analog video signals are spectrally separated (analog NTSC video signals start at 54 MHz), they can be carried together to NID 56 on a single RG-6 drop coax 92. Transport of these signals from NID 56 to terminals 60a is via the existing in-home splitter 94 and coax bus 96 within LU 14.

Preferably, the UTP drop cable 90 has a cable length from pedestal 86 to NID 56 of less than or equal to 200 feet. Also preferably, in-home wiring within each LU 14 has a cable length of less than or equal to 100 feet.

During times of high demand, a given ONU 28 transmits and receives A-ATM signals to and from multiple subtending LUs simultaneously. During such times, the CAP-16 downstream signals on the separate A-ATM cable pairs will interfere with one another through an electromagnetic coupling mechanism known as Far End Crosstalk (FEXT). Upstream CAP-4 signals simultaneously present on separate pairs will similarly generate and be exposed to FEXT interference. The signals may also introduce Near End Crosstalk (NEXT) interference to the transport system, which is even more debilitating than FEXT.

As network traffic continues to increase, and additional High-Speed Symmetric Data Services (HSDS) are added, it becomes more difficult to maintain an acceptable transport margin for a target Bit Error Rate (BER), for example a design margin of 6 dB at $10^{-9}$ BER. This is due to the effects of NEXT, FEXT, electromagnetic interference (EMI), impulse noise, temperature effects, and the like. As explained below, a channel management strategy according to the present invention improves the overall transmission system performance as measured by the ability to achieve a particular target BER or signal-to-noise ratio (SNR) at an acceptable margin, or other such performance criterion.

One approach to improving transmission system performance is to replace the telephony exchange distribution cable with cables having better characteristics for attenuation, NEXT, FEXT, and the like. Cross-talk performance may be improved by using tighter twist rates on twisted pair cabling. In addition, proper shielding helps to eliminate EMI. However, the present invention may be utilized separately from, or in addition to, replacing existing exchange cabling to improve overall system performance. As such, implementation of the present invention provides interim performance increases almost immediately while awaiting available resources to replace the existing cable plant.

Figure 3:
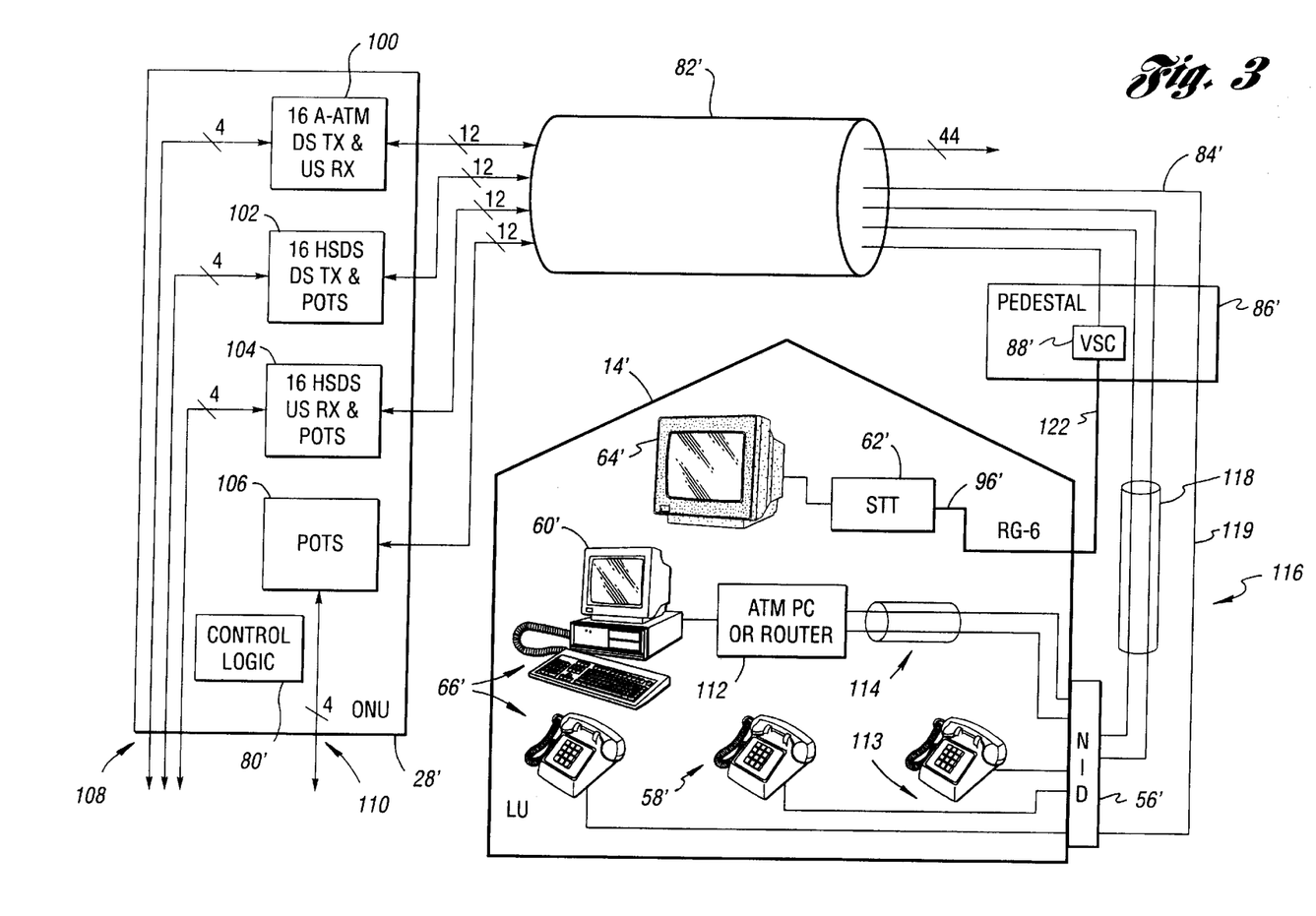
FIG. 3 illustrates an alternative broadband transmission architecture from an ONU to an associated LU delivering multiple signal types.

Referring now to FIG. 3, a block diagram illustrating one possible construction of an information distribution system according to the present invention is shown. The system combines an improved distribution cable 82' and channel management performed by control logic 80' with an ONU 28' to improve overall system performance. As previously described, control logic may reside within each ONU or, preferably is executed prior to installation of the cable plant (or portion thereof) so that each ONU may be hardwired based on the result of the signal-to-channel optimization.

The system of FIG. 3 could be used to simultaneously deliver telephony, A-ATM, and HSDS services to customers. In this example, ONU 28' serves a total of 16 LUs, such as LU 14'. Of the 16 LUs, 12 LUs are served by a 50-pair distribution cable 82' and a collection of drop cables, indicated generally by reference numeral 116. Preferably, distribution cable 82' has a cable length less than or equal to 600 feet while drop cables 116 have a cable length of less than or equal to 200 feet from pedestal 86' to their corresponding LUs. The remaining four LUs served by ONU 28' are served directly over a similar set of drop cables 108 and 110. As with the system illustrated in FIG. 2, the system of FIG. 3 allocates four twisted pairs for each LU such that all LUs could be simultaneously served with A-ATM, HSDS, and POTS services.

The ONU 28' includes a set of 16 A-ATM downstream transmitter and upstream receivers 100. To provide HSDS, 16 downstream transmitters 102 and upstream receivers 104 may also be provided in addition to a set of 16 narrowband telephony cards 106. HSDS transmitters and receivers 102 and 104 may optionally process narrowband signals as well, or interface with existing narrowband cards. ONU 28' also includes control logic 80' which may be used implement channel management according to the present invention.

As stated herein, the use of dedicated plant allocates four twisted pairs 84' within distribution cable 82' for access to a given LU, such as LU 14'. One of the four twisted pairs carries an A-ATM signal to pedestal 86' where the A-ATM signal is combined by VSC 88' with an analog video signal (not specifically illustrated). The combined signal, which is frequency division multiplexed, is carried to the LU on a single coax drop cable 122. The second of the four twisted pairs carries narrowband telephony to pedestal 86' with a telephony drop 119 completing the connection to the NID 56'. The third and fourth twisted pairs carry upstream and downstream HSDS signals, respectively, to pedestal 86' and then to NID 56' via UTP drop cable 118, which preferably meets the requirements of a category 5 cable as rated by the Electronics Industry Association/Telephone Industry Association (EIA/TIA). Where a CAP-type signaling scheme is utilized for HSDS signals, the third and fourth twisted pairs can optionally simultaneously transport narrowband and HSDS signals so that an LU requesting HSDS would not be limited to a single narrowband channel. This type of simultaneous single pair narrowband and HSDS transport may be accomplished through the use of POTS splitting filters within NID 116.

Within an LU 14', existing coaxial cable 96' and twisted pair 113 is used for A-ATM and narrowband in-home transport. An HSDS may require a category 5 cable 114 with a cable length of less than or equal to 100 feet to connect the POTS splitter and a network port 112 of the corresponding HSDS CPE.

Thus, FIG. 3 illustrates four different types of digital transmission links, each of which may contribute transmission impairments to the system. Such impairments include, but are not limited to, NEXT, FEXT, and Additive White Gaussian Noise (AWGN). Since the A-ATM upstream link operates within the 28–30 MHz band, the introduction of HSDS signals, which preferably utilize CAP-16 coding operating in the 0.5–26 MHz band, does not adversely impact this link.

The A-ATM downstream link from transmitter 100 operates in the 6–26 MHz band while both upstream and downstream CAP-16 HSDS links to transmitters 102 and receivers 104 operate in the 1–26 MHz region. As a result, the A-ATM downstream receiver within LU 14' must operate acceptably subject to the following impairments: FEXT from up to 11 A-ATM transmitters in the same distribution cable; FEXT from up to 12 HSDS downstream transmitters; NEXT from up to 12 HSDS upstream transmitters; and AWGN.

The introduction of HSDS signals into distribution cable 82' generates new NEXT and FEXT impairments with which the A-ATM receivers 112 must contend. The NEXT from the upstream HSDS transmitters is of special concern because NEXT is more troublesome to the transmission than FEXT. Where the distribution cable specification describes bounds on worst-case FEXT power sum, it is useful for system simulation purposes to replace the two types of FEXT disturbers with one, while keeping the total number of interfering transmitters constant. The worst-case performance of the actual dual-source FEXT configuration will then lie between that of the two single-source FEXT cases.

The HSDS upstream link to receiver 104 must operate in the presence of the following impairments: NEXT from up to 12 HSDS downstream transmitters; NEXT from up to 12 A-ATM downstream transmitters; FEXT from up to 11 other HSDS upstream transmitters; and AWGN. Again, the worst-case performance will lie between that of systems with 11 HSDS FEXT, AWGN, and NEXT from either 24 HSDS or 24 A-ATM downstream transmitters.

The HSDS CAP-16 downstream link from transmitter 102 must operate in the presence of the following impairments: NEXT from the single co-located HSDS upstream transmitter; NEXT from up to 11 other HSDS upstream transmitters; FEXT from up to 11 other HSDS downstream transmitters; FEXT from up to 12 A-ATM downstream transmitters; and AWGN.

Computer simulations of the various links in the transport system of FIG. 3 have been utilized to determine worst-case margin at a particular target BER. These results indicate a significant improvement in overall system performance when utilizing a channel management strategy according to the present invention compared to the traditional random assignment for the various upstream and downstream signal types. In one embodiment, the goal is to improve the worst-case performance of the limiting link by intelligently mapping channels, or twisted pairs within a distribution cable, to a particular signal type. Preferably, a single decision rule based on predetermined cable characteristics is applied uniformly across all ONU installations. In this case, the worst-case margin for a link is the minimum margin experienced across all pairs assigned to that link type.

Figure 4:
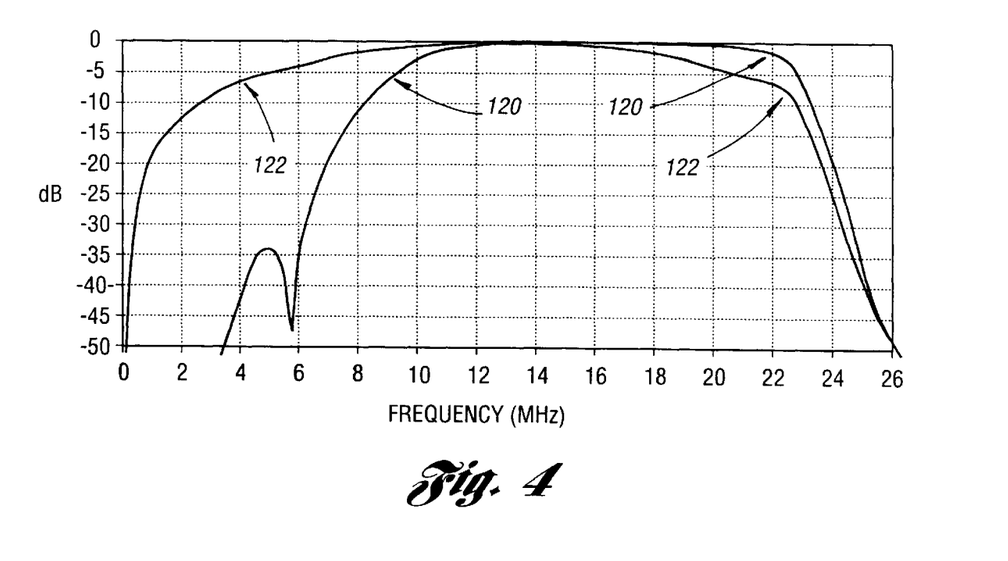
FIG. 4 illustrates filter responses for A-ATM and HSDS CAP-16 transmitters for random signal-to-channel assignment.

FIG. 4 illustrates the response characteristics for filters used in a simulation of the transmission system of FIG. 3. As illustrated, the HSDS filter response 122 extends from about 0.5 MHz to about 26 MHz while the A-ATM filter response 120 extends from about 6 MHz to about 26 MHz. For the simulation, receiver AWGN included amplifier thermal noise at −130 dBm/Hz in addition to quantization noise introduced by an 8-bit A/D. All subtending pedestals from the ONU being simulated were assumed to be 600 feet away from that ONU. While in actual implementations the pairs for consecutive sets of four LUs may be spliced at pedestals every 100–200 feet along the distribution, the level of NEXT, which is the dominant impairment in the links under study, will not be appreciably affected by that assumption.

For simulations of the HSDS upstream link, the LU drop cables were assumed to be approximately 200 foot in length with an additional 100 feet of wiring length within the LU. For simulations of the downstream A-ATM link, the LU housing the receiver under study was assumed to be 900 cable-feet away from the ONU. In an attempt to reasonably maximize that link's NEXT level, however, the other LU upstream transmitters were only 50 cable feet away from the downstream distribution cable end. The results were based on a CAP-16 adaptive receiver model with 32 fractionally spaced equalizer taps (T/4) and a decision feedback equalizer as illustrated and described with reference to FIG. 5.

Figure 5:
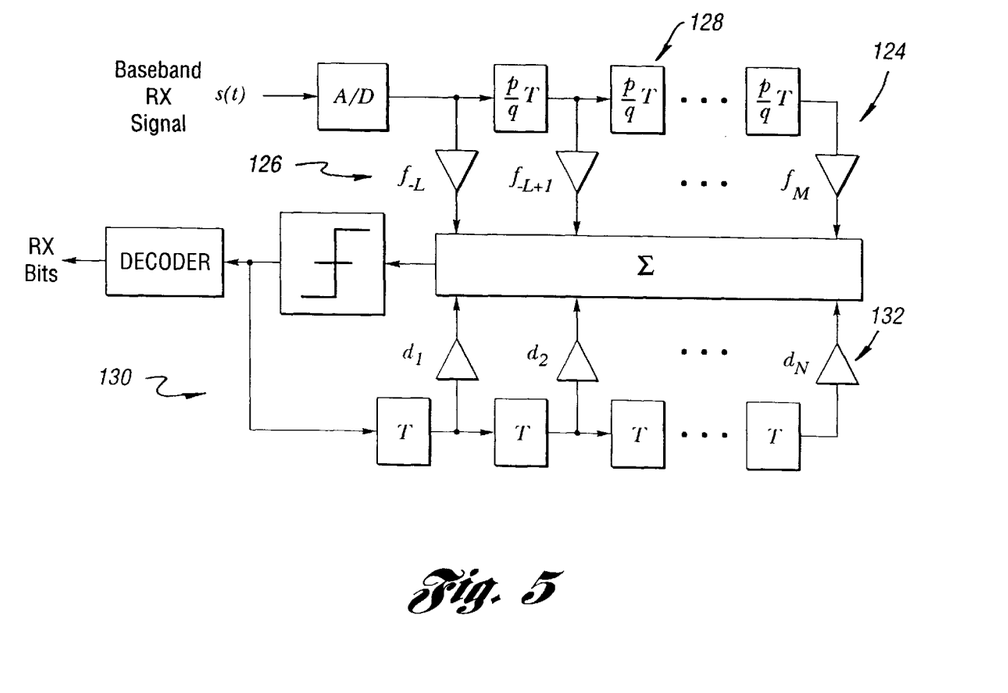
FIG. 5 is a block diagram of a complex baseband receiver equipped with a fractionally spaced linear equalizer and a decision feedback equalizer.

Referring now to FIG. 5, the simulation assumed the complex fractionally-spaced linear equalizer (FSE) 124 contains taps 126, represented by $f_k$ where $-L \leq k \leq M$ with L taps before and M taps after a reference tap $f_0$ (not specifically illustrated), and that for a symbol period of T, the tap spacing is pT/q for positive integers p and q as indicated by reference numeral 128. The decision feedback equalizer (DFE) 130 contained N taps 132, represented by $d_k$ where $1 \leq k \leq N$ and where N may be zero indicating that the decision feedback equalizer loop is not present. The complex baseband input signal s(t) may be represented by:

$$s(t) = \sum_{i=0}^{I} \left\{ \sum_n a_n^i h_i(t-nT) \right\} + v(t) \quad (1)$$

where $a_n^0$ is the symbol sequence to be detected, $a_n^i$, $1 \leq i \leq I$, are the symbol sequences carried by I synchronous interfering signals, $h_0(t)$ is the main channel complex equivalent baseband impulse response, and $h_i(t)$, $1 \leq i \leq I$, are the interfering channel complex equivalent baseband impulse responses. v(t) is colored Gaussian noise with the sampled autocorrelation sequence:

$$\eta_k = \frac{1}{A^2} E[v(t+kpT/q)v^*(t)] \quad (2)$$

where the symbol sequences are assumed white and of power $A^2$, i.e., $$E[a_n^i(a_{n-k}^j)^*] = A^2 \delta_k \delta_{i-j}, \; 0 \leq i \leq I, \; 0 \leq j \leq I \quad (3)$$

Then define the vector and matrix quantities, $$f = [f_{-L} f_{-L+1} \ldots f_M]^T \quad (4)$$

$$d = [d_1 d_2 \ldots d_N]^T \quad (5)$$

$$h = [h_0(LpT/q) h_0([L-1]pT/q \ldots h_0(-MpT/q)]^T \quad (6)$$

$$H = \quad (7)$$

$$\begin{bmatrix} h_0*(1+Lp/qT) & h_0^*([1+(L-1)p/q]T) & \ldots & h_0^*([1-Mp/q]T) \\ h_0^*([2+Lp/qT) & h_0^*([2+(L-1)p/qT) & \ldots & h_0^*([2-Mp/q]T) \\ h_0^*([N+Lp/qT) & h_0^*([N+(L-1)p/qT) & \ldots & h_0^*([N-Mp/q]T) \end{bmatrix}$$

and $$R = [r(i,j), \; -L \leq i,j \leq M] \quad (8)$$

where $$r(i,j) = \eta_{j-i} + \sum_{m \notin [1,N]} h_0([m-ip/q]T) h_0^*([m-jp/q]T) + \quad (9)$$

$$\sum_{k=1}^{I} \sum_m h_k([m-ip/q]T) h_k^*([m-jp/q]T)$$

and where $(\;)^T$ denotes matrix transpose. With these definitions, the MMSE FSE and DFE taps are given by:

$$f_{opt} = (R^{-1}h)^* \quad (10)$$

$$d_{opt} = H^* f_{opt} \quad (11)$$

and the MMSE is:

$$j_{min} = A^2(1 - h^H R^{-1} h) \quad (12)$$

where $(\;)^H$ denotes conjugate transpose. For a QAM16 or CAP-16 constellation, $A^2 = 10$, and the receiver symbol error rate is:

$$Pr(\text{error}) = 3Q\left(\sqrt{2/J_{min}}\right) \quad (13)$$

where $$Q(x) = \frac{1}{\sqrt{2\pi}} \int_x^\infty e^{-y^2/2} dy \cong \frac{e^{-x^2/2}}{x\sqrt{2\pi}} \quad (14)$$

The results of the simulations reflected the evaluation of Equations 10–14 for particular channel and noise conditions. The channel in all cases consisted of the cascade of the insertion gain of 600 feet of distribution cable, the appropriate drop in inside wiring cables, and the transmit filter shown in FIG. 4. The colored Gaussian noise consists of AWGN plus any stationary NEXT or FEXT sources, the power spectral densities of which are given by:

$$S_{NEXT}(f) = cf^{\beta/2} S_{TX}(f) \quad (15)$$

and $$S_{FEXT}(f) = Klf^2 S_{TX}(f) |H_{cable}(f)|^2 \quad (16)$$

where $S_{TX}(f)$ is the disturbing transmitters' power spectral density, $H_{cable}(f)$ is the disturbing cable's frequency response, and for l in feet and f in Hertz the constants C and K are given in Table 1, at zero dB margin noise levels.

TABLE 1

NEXT and FEXT Coupling Constants For Different Cable Types

| Cable Type | C(0 dB Margin) | K (0 dB Margin) |
|---|---|---|
| 50-Pair Exchange | $8.817 \times 10^{-14}$ | $8.001 \times 10^{-20}$ |
| Shielded EIA/TIA Category 4 | $2.336 \times 10^{-15}$ | $8.106 \times 10^{-21}$ |
| EIA/TIA Category 5 | $5.869 \times 10^{-16}$ | NA |

The determination of a link's margin is made by scaling all 0 dB noise and interference powers by an amount corresponding to the margin, and recording the resulting BER from Equation (13). The margin at which the target BER is recorded is, by definition, the margin of the link.

Applying this analysis to the transmission system links illustrated and described with reference to FIG. 3 results in the following worst-case results summarized in Table 2.

TABLE 2

Worst-Case Simulated Link Margins With Random Pair-to-Signal Mappings

| Link | Impairments | Worst-Case Margin |
|---|---|---|
| HSDS Upstream 51.84 Mb/s | • Power-Sum Spec NEXT from HSDS downstream TX<br>• Power-Sum Spec FEXT from HSDS upstream TX<br>• AWGN (−130 dBm/Hz plus 8-bit A/D) | 1.0 dB |
| HSDS Upstream 51.84 Mb/s | • Power-Sum Spec NEXT from A-ATM downstream TX<br>• Power-Sum Spec FEXT from HSDS upstream TX<br>• AWGN (−130 dBm/Hz plus 8-bit A/D) | 1.8 dB |
| A-ATM Downstream 51.84 Mb/s | • Power-Sum Spec NEXT from HSDS upstream TX<br>• Power-Sum Spec FEXT from A-ATM downstream TX<br>• AWGN (−130 dBm/Hz plus 8-bit A/D) | 2.0 dB |
| A-ATM Downstream 51.84 Mb/s | • Power-Sum Spec NEXT from HSDS upstream TX<br>• Power-Sum Spec FEXT from HSDS downstream TX<br>• AWGN (−130 dBm/Hz plus 8-bit A/D | 2.3 dB |

As can be seen, the HSDS upstream link is limiting for the random pair mapping case, i.e. where no channel management strategy is utilized. Neither the HSDS upstream nor the A-ATM downstream links appeared to meet a target performance level of 6.0 dB margin with a $10^{-9}$ BER. Regardless of the particular target margins, or other performance criterion, channel management according to the present invention improves system robustness against NEXT and FeXT with no increase in capital costs associated with cable plant replacement. For any particular transport system, such as that illustrated in FIG. 3, an improvement of approximately 10 dB margin is expected.

Figure 6:
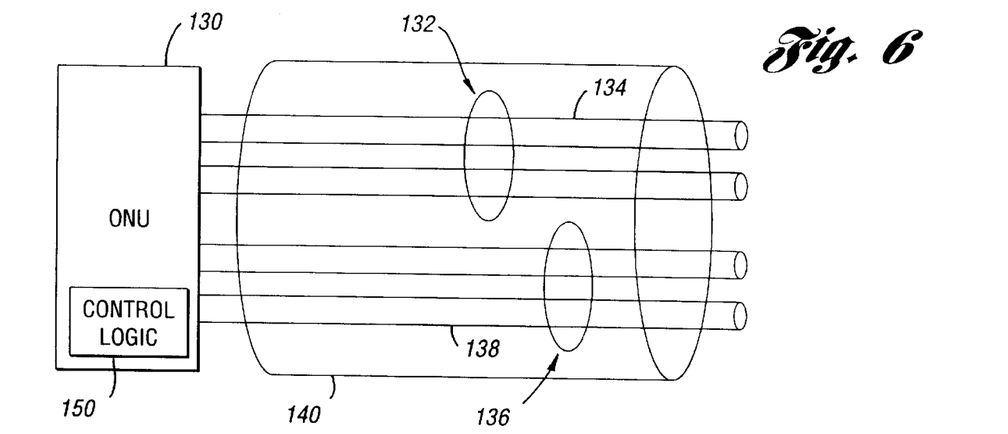
FIG. 6 is a diagram illustrating a particular decision rule in a system and method according to the present invention.

A system and method for multi-signal, multi-channel management according to the present invention will now be described with reference to FIGS. 6–8. One embodiment of a channel management strategy is illustrated schematically in FIG. 6. ONU 130 is connected to a pedestal (not specifically illustrated) by a number of twisted pairs within a distribution cable 140. The twisted pairs are arranged in a number of binder groups, such as binder group 134 or binder group 138, which are physically separated from each other within distribution cable 140. The various binder groups may be logically divided (i.e. not actually separated) into two equally sized sets, such as downstream set 132 and upstream set 136. Each downstream binder group set 132 would include 1 A-ATM and 1 HSDS downstream twisted pair per LU. Each upstream binder group set 136 would include one HSDS upstream pair and one POTS only pair per LU.

Control logic 150 within ONU 130 may be used to implement a particular channel management strategy according to the present invention. As disclosed above, the present invention contemplates a fixed mapping of each LU signal to a specific distribution cable pair where the same mapping is applied consistently to all ONUs. Table 3 illustrates the results of an example decision rule in a channel management strategy for an ONU with 16 subtending LUs. A 50-pair distribution cable serves 12 of the 16 LUs, and 4 LUs are served directly via drop cables as illustrated in FIG. 3.

TABLE 3

Example Pair Management Rule in a 50-Pair Buried Cable

| LU | SIGNALS | BINDER GROUP | Pairs |
|---|---|---|---|
| 1 | A-ATM, HSDS Downstream | Blue-White | 1, 2 |
| 1 | HSDS Upstream, POTS | Orange-White | 1, 2 |
| 2 | A-ATM, HSDS Downstream | Blue-White | 3, 4 |
| 2 | HSDS Upstream, POTS | Orange-White | 3, 4 |
| 3 | A-ATM, HSDS Downstream | Blue-White | 5, 6 |
| 3 | HSDS Upstream, POTS | Orange-White | 5, 6 |
| . | . | . | . |
| . | . | . | . |
| . | . | . | . |
| 12 | A-ATM, HSDS Downstream | Blue-White | 23, 24 |
| 12 | HSDS Upstream, POTS | Orange-White | 23, 24 |

The correspondence between a given residence and its LU number as shown in Table 3 may be arbitrary or more may be established according to certain other decision rules. For the example decision rule illustrated in Table 3, after LU number 1 is identified, all that is required is that pair 2 from the blue-white binder group be allocated for HSDS downstream transport to that LU. Similarly, pair one from the blue-white group is reserved for A-ATM. In a like manner, every other cable pair is reserved for the transport of a certain signal type (A-ATM, POTS, HSDS downstream, or HSDS upstream) to a certain LU number. In addition to improving the overall performance of the transport system, implementation of a channel management scheme according to the present invention simplifies recordkeeping and associated aspects of network operations.

For example, the only information required to identify the channel belonging to the residence at 123 Main Street is a record of the fact that, within its ONU neighborhood, 123 Main Street is LU No. 7.

Preferably, channel management according to the present invention identifies the channel-to-signal mapping within a given distribution cable type (i.e. buried or aerial) that maximizes or optimizes the overall system performance based on one or more predetermined criterion. For each possible channel-to-signal mapping, the NEXT and FEXT power sums as a function of frequency are determined based on measured channel-to-channel responses. This information may then be used to evaluate the criterion, such as transport margin or SNR, for each of the digital links within a particular distribution cable. The particular mapping which results in maximizing or optimizing the selected criterion is then used to assign a particular signal type to each of the channels within the distribution cable.

Figure 7:
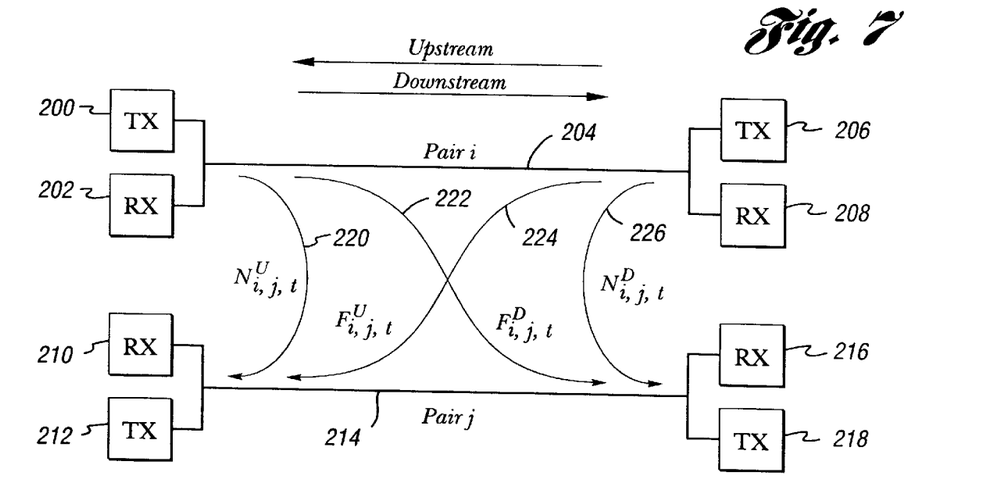
FIG. 7 is a diagrammatic illustration of calculation of crosstalk interference for channel management according to the present invention.

Referring now to FIG. 7, a formulation of the optimization problem for a multiple twisted pair distribution cable is illustrated diagrammatically. The distribution cable connects downstream transmitters 200,212 to receivers 208, 216 and upstream transmitters 206,218 to receivers 202, 210, respectively, via twisted pairs 204,214. M represents a set of copper pairs within a distribution cable, indexed by i where i ranges from unity to n, the total number of copper pairs in a cable. M represents a set of signal types carried over the distribution cable, indexed by k which ranges from unity to m where each signal type implies a specific upstream and downstream signal (e.g. where signal one is A-ATM, signal two is HSDS downstream, signal three is HSDS upstream, and signal four is a POTS only signal). Thus, $m_k$ represents the number of signals of type $k \in M$ to be carried in the cable.

With continuing reference to FIG. 7, $N_{i,j,t}^u$ represents the NEXT from pair i 204 into pair j 214 upstream receiver 210 at frequency sample of $t \in T$, indicated generally by reference numeral 220. Similarly, reference numeral 226 indicates the NEXT as represented by $N_{i,j,t}^d$, from pair i 204 into pair j 214 downstream receiver 216 at frequency sample $t \in T$. Likewise, reference numeral 224 indicates FEXT, represented by $F_{i,j,t}^u$, from pair i 204 into pair j 214 upstream receiver 210 at frequency sample $t \in T$ while reference numeral 222 indicates FEXT, represented by $F_{i,j,t}^d$ from pair i 204 into pair j 214 downstream receiver 216 at frequency sample $t \in T$.

The total power received by downstream receiver 208 on pair i 204 is given by:

$$S_i^d = \sum_{t \in T} S_{i,t}^d \qquad (17)$$

where $S_i^d$ is the total received power, $S_{i,t}^d$ is the signal power into receiver 208 at frequency sample $t \in T$. Similarly, the total power received by receiver 202 on pair i 204 may be represented by:

$$S_i^u = \sum_{t \in T} S_{i,t}^u \qquad (18)$$

where $S_i^u$ represents the total received power and $S_{i,t}^u$ represents the signal power into receiver 202 at frequency sample $t \in T$.

The total power contributed by NEXT and FEXT into upstream receiver 202 on pair i 204 may be represented by:

$$Q_i^u = \sum_{t \in T} Q_{i,t}^u, \qquad (19)$$

and likewise, the total power contributed by NEXT and FEXT into downstream receiver 208 on pair i 204 may be represented by:

$$Q_i^d = \sum_{t \in T} Q_{i,t}^d, \qquad (20)$$

where:

$Q_{i,t}^d$ represents the NEXT and FEXT power into downstream receiver 208 on pair i 204 at frequency sample $t \in T$;

$Q_{i,t}^u$ represents NEXT and FEXT power into upstream receiver 202 on pair i 204 at frequency sample $t \in T$;

$Q_i^u$ represents the total NEXT and FEXT power into upstream receiver 202; and $Q_i^d$ represents the total NEXT and FEXT power into downstream receiver 208.

The total noise power, $V_i^d$, from sources other than NEXT and FEXT into downstream receiver 208 on pair i 204 may be represented by:

$$V_i^d = \sum_{t \in T} V_{i,t}^d, \qquad (21)$$

where $V_{i,t}^d$ represents noise power from sources other than NEXT and FEXT into downstream receiver 208 at frequency sample t. Similarly, the total noise power, $V_i^u$, from sources other than NEXT and FEXT coupled into upstream receiver 202 may be represented by:

$$V_i^u = \sum_{t \in T} V_{i,t}^u \qquad (22)$$

where $V_{i,t}^u$ is the noise power from sources other than NEXT and FEXT, into receiver 202 at frequency sample t.

If $\chi_{ik}=1$, when pair $i \in N$ carries signal type $k \in M$ and $\chi_{ik}=0$ otherwise, then, for each $i \in N$ and $t \in T$, $S_{i,t}$, $Q_{i,k}$, $V_{i,t}$ and $G_i$ can be represented as follows:

$$S_{i,t}^d = |F_{i,i,t}^d|^2 \sum_{k \in M} P_{k,t}^d \chi_{i,k}, \qquad (23)$$

$$S_{i,t}^u = |F_{i,i,t}^u|^2 \sum_{k \in M} P_{k,t}^u \chi_{i,k}, \qquad (24)$$

$$Q_{i,t}^d = \sum_{j \in N, j \neq i} \sum_{k \in M} \chi_{jk} (P_{k,t}^d |F_{j,i,t}^d|^2 + P_{k,t}^u |N_{j,i,t}^d|^2) \qquad (25)$$

$$Q_{i,t}^u = \sum_{j \in N, j \neq i} \sum_{k \in M} \chi_{jk} (P_{k,t}^u |F_{j,i,t}^u|^2 + P_{k,t}^d |N_{j,i,t}^u|^2) \qquad (26)$$

$$V_{i,t}^u = \sum_{k \in M} \chi_{ik} W_{k,t}^u \qquad (27)$$

$$V_{i,t}^d = \sum_{k \in M} \chi_{ik} W_{k,t}^d \qquad (28)$$

$$G_i^d = \sum_{k \in M} \chi_{ik} H_k^d \qquad (29)$$

$$G_i^u = \sum_{k \in M} \chi_{ik} H_k^u \qquad (30)$$

where:

$W_{k,t}^d$ is noise power from sources other than NEXT and FEXT into a downstream receiver of signal type k at frequency sample $t \in T$;

$W_{k,t}^u$ is noise power from sources other than NEXT and FEXT into an upstream receiver of signal type k at frequency sample t∈T;

$G_i^u$=SNR reference level for upstream receiver on pair i ∈N;

$G_i^d$=SNR reference level for downstream receiver on pair i∈N;

$H_d^k$ is the SNR reference level for downstream receiver of signal type k∈M;

$H_u^k$ is the SNR reference level for upstream receiver of signal type k∈M;

$P_{k,t}^u$=power spectral density (PSD) of signal type k, upstream channel, at frequency sample t∈T; $P_{k,t}^d$= power spectral density (PSD) of signal type k, downstream channel, at frequency sample t∈T.

The optimal pair assignment problem based on maximizing the minimum SNR margin, measured relative to given SNR references $\{G_i^u, G_i^d\}$, can be formulated as follows:

$$\text{Maximize } \min_{i \in N} \left\{ \min\left( \frac{S_i^d}{(Q_i^d + V_i^d)G_i^d}, \frac{S_i^u}{(Q_i^u + V_i^u)G_i^u} \right) \right\} \quad (31)$$

subject to $$\sum_{i \in N} \chi_{ik} = m_k \quad \forall\, k \in M \quad (32)$$

$$\sum_{k \in M} \chi_{ik} = 1 \quad \forall\, i \in N \quad (33)$$

$$\chi_{ik} \in \{0, 1\}, \quad \forall\, i \in N, \forall\, k \in M.$$

Figure 8:
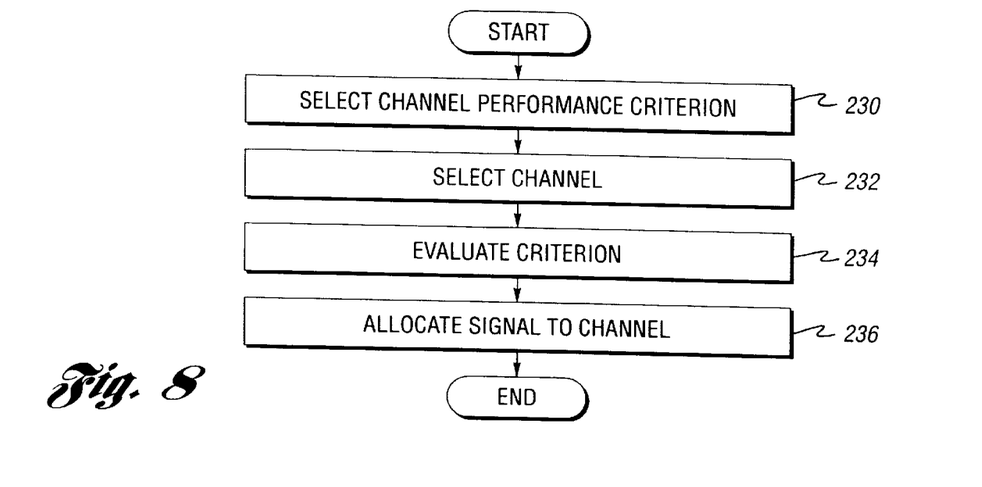
FIG. 8 is a flow chart illustrating a method for channel management according to the present invention.

Referring now to FIG. 8, a flow chart illustrating a method of channel management according to the present invention is shown. As will be appreciated by one of ordinary skill in the art, the method may be performed by control logic implemented by software in conjunction with a programmable microprocessor, hardware, or a combination of both. Hardware may include dedicated electrical and electronic circuits, or programmable devices such as FPGAs and the like.

As represented by block 230 of FIG. 8, one or more channel performance criterion are selected based on the particular application. Performance criterion may be SNR, BER, margin, and the like since the present invention is not limited to a particular criterion but utilizes one or more rules of decision to allocate signals to channels.

Block 232 of FIG. 8 represents selecting a particular channel mapping which allocates a signal type to each available channel. The performance criterion selected in step 230 is then evaluated for the particular signal-to-channel mapping, selected at step 232, as represented by step 234. Steps 232 and 234 may be repeated for all of the available signal-to-channel mappings. This may consist of all permutations of signal types and channels, or some subset thereof. Conceptually, steps 232 and 234 represent optimization of the signal-to-channel mapping determined by the performance criterion of step 230 within the operating constraints of the system. Step 236 then allocates a particular signal type to a particular channel within a distribution cable based on the results of the previous steps.

Alternatively, well known mathematical programming algorithms may be used to determine the optimal signal to channel mapping 236, without the need of repeating steps 232,234 for all possible mappings. A flowchart for one such algorithm described by equations 17–33 is shown in FIG. 9.

Other techniques also exist which may be used to provide a solution to the multi-signal, multi-channel problem of the present invention.

Figure 9:
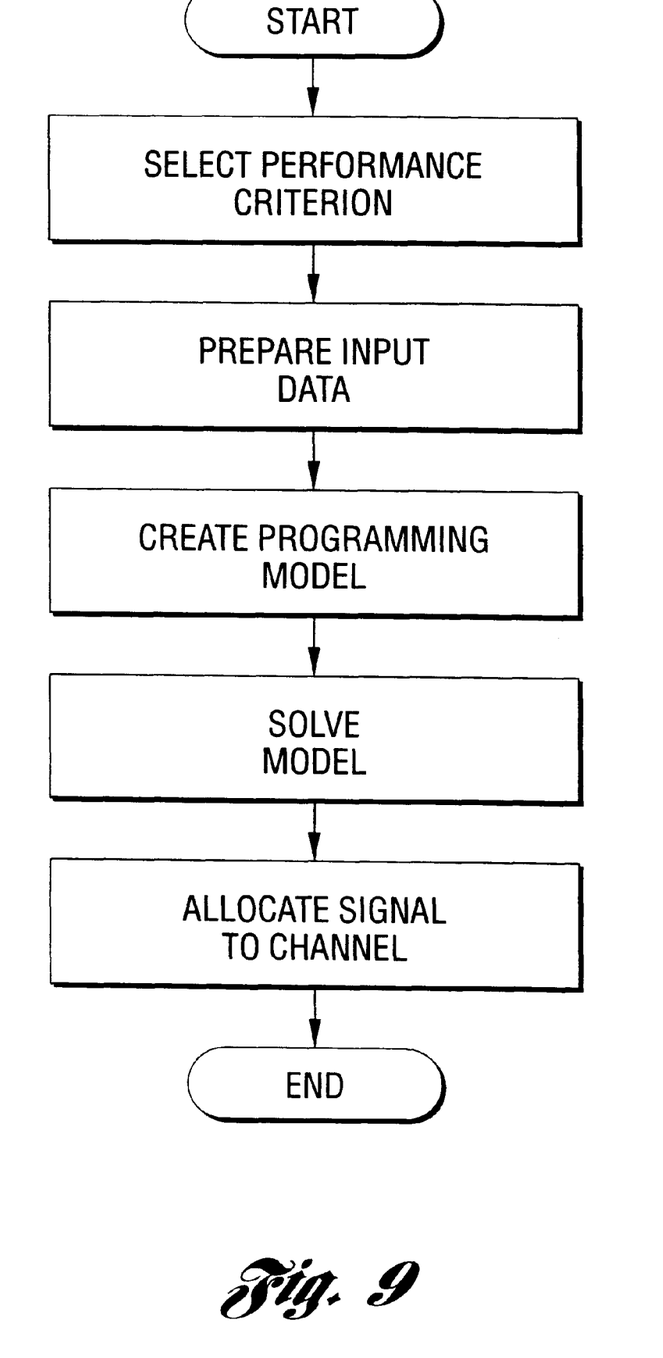
FIG. 9 is a flow chart illustrating an alternative implementation of a method for channel management according to the present invention.

Referring now to FIG. 9, a flowchart illustrating an alternative implementation of a method for channel management according to the present invention is shown. Similar to the flowchart of FIG. 8, block 250 represents selection of a performance criterion for allocating a particular signal type to a particular channel. As described, suitable performance criteria may include any one or a combination of SNR, SNR margin, or the like. Block 252 represents preparation of the input data corresponding to the particular signal types and available channels of a particular application. An instance of an integer programming model is then created based on the input data as represented by block 254.

With continuing reference to FIG. 9, the programming model is solved as represented by block 256. This step includes additional preprocessing of the data to eliminate redundant constraints and variables. Block 256 also includes determining a lower bound by solving the linear programming relaxation and upper bounding by developing a heuristic solution using the genetic algorithm. The steps of lower bounding and upper bounding are then repeated until a gap between the lower and upper bounds satisfies a predetermined error selected based on the particular application. Block 256 then returns a solution which is used to allocate the various signal types to appropriate channels as represented by block 258.

As previously described, the present invention contemplates implementation of the decision rules across each ONU within the transmission system, thereby simplifying cable plant recordkeeping.

While the best mode for carrying out the invention has been described in detail, those familiar with the art to which this invention relates will recognize various alternative designs and embodiments for practicing the invention as defined by the following claims.

What is claimed is:

1. A method for improving performance of a transmission system used for communicating a plurality of signal types over a plurality of communication channels extending between at least one transmitter and at least one receiver, the method comprising:

selecting at least one performance criterion indicative of signal quality at the at least one receiver;

associating each of the plurality of signal types with a corresponding one of the plurality of communication channels so as to define a plurality of available signal-to-channel maps;

evaluating the selected criterion for each of the plurality of associated signal types and communication channels in a particular signal-to-channel map;

storing a lowest value of the selection criterion for the particular signal-to-channel map;

repeating the steps of evaluating and identifying for each of the plurality of available signal-to-channel maps; and selecting the signal-to-channel map based on the stored values.

2. The method of claim 1 further comprising:

transmitting each of the plurality of signal types over a corresponding assigned communication channel.

3. The method of claim 1 wherein the step of selecting comprises selecting signal to noise ratio as the at least one performance criterion.

4. The method of claim 1 wherein the step of selecting comprises selecting signal to noise ratio margin relative to a set of signal to noise ratio references corresponding to the set of signal types as the at least one performance criterion.

5. The method of claim 1 wherein the plurality of signal types includes a digital signal type and wherein the step of selecting includes selecting transmission margin at a predetermined bit error rate as the at least one performance criterion.

6. The method of claim 1 wherein the step of selecting the signal-to-channel map comprises selecting the signal-to-channel map having the highest stored value.

7. The method of claim 1 wherein the step of selecting comprises selecting at least one performance criterion indicative of near-end crosstalk and far-end crosstalk.

8. A method for improving performance of a transmission system used for communicating a plurality of signal types over a distribution cable having a plurality of twisted pairs extending between at least one transmitter and at least one receiver, the method comprising:
   associating each of the plurality of signal types with a corresponding one of the plurality of twisted pairs so as to define a plurality of available signal-to-pair mappings;
   measuring pair to pair electromagnetic coupling for at least two of the plurality of twisted pairs;
   selecting the signal-to-lair mapping which improves system performance as determined by the measured pair to pair electromagnetic coupling; and
   assigning each of the plurality of signal types to one of the plurality of twisted pairs based on the selected signal-to-pair mapping.

9. The method of claim 8 further comprising:
   transmitting each of the plurality of signal types over a corresponding assigned twisted pair.

10. The method of claim 9 wherein the plurality of twisted pairs is separated into a plurality of binder groups, the plurality of signal types includes an upstream signal traveling in a direction opposite to a downstream signal, and wherein the step of assigning comprises:
   assigning the upstream signal to a first one of the plurality of binder groups and assigning the downstream signal to a second one of the plurality of binder groups.

11. The method of claim 10 wherein the upstream and downstream signals are digital signals.

12. The method of claim 8 wherein the plurality of signal types includes at least one digital signal and wherein the step of measuring comprises:
   computing the near end crosstalk and far end crosstalk power sums as a function of frequency; and
   computing transmission margin for each of the at least one digital signal types for a predetermined error rate.

13. The method of claim 12 wherein the step of assigning comprises assigning each of the plurality of signal types to one of the plurality of twisted pairs based on the signal-to-pair mapping which maximizes the minimum transmission margin at a predetermined bit error rate.

14. The method of claim 12 wherein the step of assigning comprises assigning each of the plurality of signal types to one of the plurality of twisted pairs based on the signal-to-pair mapping which optimizes signal to noise margin.

15. The method of claim 12 wherein the step of assigning comprises assigning each of the plurality of signal types to one of the plurality of twisted pairs based on the signal-to-pair mapping which optimizes signal to noise ratio.

16. Apparatus for improving performance of a transmission system used for communicating a plurality of signal types over a plurality of communication channels extending between at least one transmitter and at least one receiver, the apparatus comprising:
   control logic for selecting at least one performance criterion indicative of signal quality at the at least one receiver, evaluating at least one rule of decision based on the at least one performance criterion,
   associating each of the plurality of signal types with a corresponding one of the plurality of communication channels so as to define a plurality of available signal-to-channel maps,
   evaluating the selected criterion for each of the plurality of associated signal types and communication channels in a particular signal-to-channel map,
   storing a lowest value of the selection criterion for the particular signal-to-channel map,
   repeating the steps of evaluating and identifying for each of the plurality of available signal-to-channel maps,
   selecting the signal-to-channel map based on the stored values.

17. The apparatus of claim 16 wherein the control logic selects the signal-to-channel map having the highest stored value.

18. The apparatus of claim 16 wherein the control logic selects signal-to-noise ratio margin as the at least one performance criterion.

19. The apparatus of claim 16 wherein the control logic evaluates at least one rule of decision based on mathematical optimization which maximizes a minimum value of the at least one performance criterion.

* * * * *